(12) United States Patent
Saitoh

(10) Patent No.: US 7,141,958 B2
(45) Date of Patent: Nov. 28, 2006

(54) POWER SUPPLY APPARATUS AND POWER SUPPLY CONTROL DEVICE

(75) Inventor: Manabu Saitoh, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 10/709,519

(22) Filed: May 11, 2004

(65) Prior Publication Data

US 2005/0122088 A1 Jun. 9, 2005

(30) Foreign Application Priority Data

May 12, 2003 (JP) .............................. 2003-133489

(51) Int. Cl.
*G05F 5/00* (2006.01)
*G05F 1/652* (2006.01)
(52) U.S. Cl. ....................... 323/299; 323/222; 323/284
(58) Field of Classification Search ................ 323/222, 323/225, 247, 276, 282, 284, 285, 299, 301
See application file for complete search history.

(56) References Cited

U.S. PATENT DOCUMENTS

| 6,469,481 | B1 * | 10/2002 | Tateishi ....................... 323/282 |
| 6,879,136 | B1 * | 4/2005 | Erisman et al. ............. 323/282 |
| 2004/0100240 | A1 * | 5/2004 | Natsume et al. ............. 323/282 |
| 2004/0100241 | A1 | 5/2004 | Natsume et al. ............. 323/282 |

FOREIGN PATENT DOCUMENTS

JP 10-295074 11/1998

* cited by examiner

*Primary Examiner*—Jessica Han
(74) *Attorney, Agent, or Firm*—Michael J. Lestrange

(57) ABSTRACT

A power supply apparatus is provided, which reduces undershoot of a DC source voltage when a power supply interrupt occurs. The power supply apparatus supplies a DC voltage to an output of the power supply apparatus, an output capacitor is provided between the power supply output and ground, and a resistor controls the discharge time constant when the supply of source voltage is temporarily halted. The resistor is coupled in series with a switch, forming a discharge path to ground for the output capacitor. A discharge path switch disables the discharge path when source voltage is supplied. The discharge path is enabled in the event of a power supply interrupt and disabled during normal power supply operation.

19 Claims, 4 Drawing Sheets

US 7,141,958 B2

POWER SUPPLY APPARATUS AND POWER SUPPLY CONTROL DEVICE

BACKGROUND OF INVENTION

1. Field of the Invention

This invention relates to a power supply apparatus and a power supply control device, and particularly to a power supply apparatus and a power supply control device to reduce undershoot of source voltage when a power supply interrupt occurs.

2. Background of the Invention

Conventional integrated circuit power supply systems include, a DC/DC converter with a synchronous commutation type switching regulator. When a power supply incorporating a DC/DC converter experiences an interrupt, a synchronous commutation FET is commonly used to discharge an output capacitor on the low voltage side of the DC/DC converter.

However, this approach suffers from a rapid decrease in source voltage as the output capacitor discharges, which may result in voltage undershoot of the power supply. Japanese Published Unexamined Patent Application (PUPA) 10-295074 (pp. 3 and 6, FIG. 2) discloses a method of preventing undershoot whereby a synchronous commutation FET coupled to the low voltage side of a DC/DC converter is turned off. At the onset of a power supply interrupt, an output capacitor is gradually discharged through a resistance connected between an output terminal of the source voltage and ground, which divides the voltage from the output terminal.

An aluminum or tantalum output capacitor is disclosed in Japanese PUPA 10-295074, which exhibits a dedicated polarity for each terminal and cannot be reverse biased without damaging the device. Therefore, discharging an output capacitor with an active synchronous commutation FET on the low voltage side of the DC/DC converter may result in a reverse bias of the output capacitor due to the voltage undershoot caused by the power supply interrupt, leading in turn to mechanical failure of the output capacitor. This is not an unusual occurrence since semiconductor devices connected to a power supply apparatus typically specify an allowable reverse voltage value. Accordingly, if reverse voltage with undershoot is applied to such a semiconductor device, malfunction or physical damage may result.

Conversely, if an output capacitor is gradually discharged while a synchronous commutation FET on the low voltage side of the DC/DC converter is turned off, the source voltage slowly decreases and a reverse voltage outside the specification of the semiconductor may be applied. In this instance, the probability of malfunction of the semiconductor is increased.

SUMMARY OF INVENTION

The purpose of this invention is to provide a power supply apparatus and a power supply control device, which can solve the above-described problems. According to a first aspect of the invention, a power supply apparatus adapted to supply a DC source voltage is provided that includes a source voltage supply unit to supply a source voltage to an output edge of the power supply apparatus. An output capacitor is coupled between the power supply output edge and ground and is discharged through a resistor coupled to a FET switch in the power supply control device. The discharge path is enabled in the event of a power supply interrupt and disabled during continuous power supply operation.

DETAILED DESCRIPTION

The present invention is directed to a power supply apparatus that reduces undershoot of source voltage and quickly discharges an output capacitor to mitigate the adverse effects of a power supply interrupt.

Figure 1:
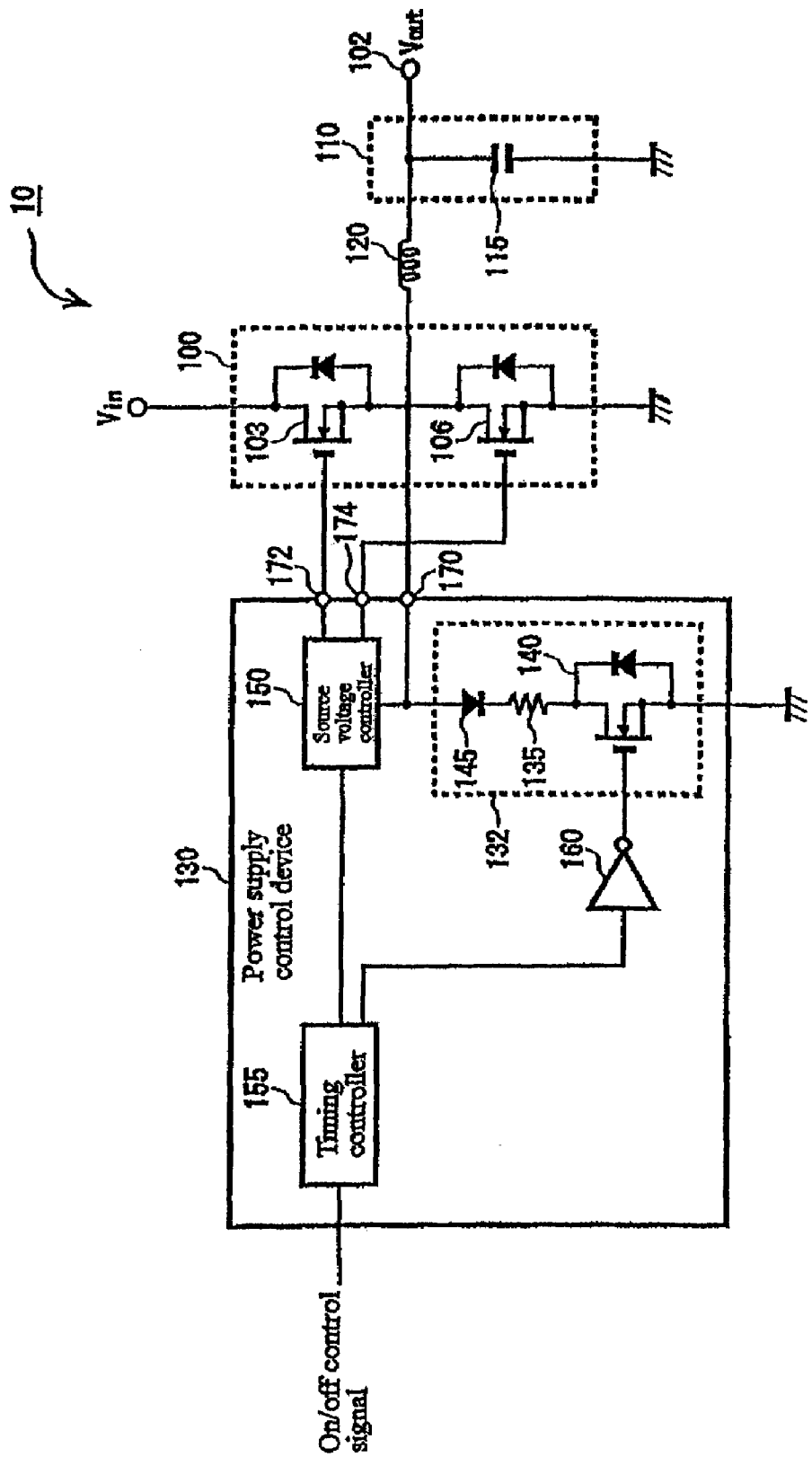
FIG. 1 illustrates the structure of the power supply apparatus 10 according to an embodiment of the invention.

FIG. 1 shows a power supply 10 that supplies a DC source voltage Vout, and has a discharge path 132 to discharge electrical charge accumulated in an output capacitor 115 through a discharge resistor 135 when a power supply interrupt occurs. During an interrupt, the power supply apparatus 10 turns on the discharge path 132 and discharges the output capacitor 115 according to an RC time constant controlled by the discharge resistor 135. The value of the resistor 135 may be set such that the degree of voltage undershoot is within a predefined value and the time until the source voltage decreases to zero, as measured from the interrupt of the supply, is within a specified time. The power supply apparatus 10 has a source voltage supply unit 100, an output capacitor 115, a output voltage coil 120 and a power supply control device 130.

The source voltage supply unit 100 supplies a DC source voltage to a power supply output 102 at the edge of the power supply apparatus 10. According to the invention, the source voltage supply unit 100 has a high voltage side switch 103 and a low voltage side switch 106.

A high voltage side switch 103 is provided between a voltage source, Vin and the power supply output edge. In FIG. 1, the high voltage side switch 103 is shown as a MOS type FET with the drain connected to the voltage source Vin, and the source connected to the output voltage coil 120, the drain of the low voltage side switch 106 and the discharge path 132. If the source voltage, Vout supplied by the source voltage supply unit 100, is less than a predetermined voltage standard, the high voltage side switch 103 is turned on by the power supply control device 130. In this embodiment, the high voltage side switch 103 connects the voltage source Vin, which is higher than the source voltage Vout, to the power supply output edge 102 through the output voltage coil 120. The voltage source Vin is preferably higher than the standard voltage.

The low voltage side switch 106 is a FET, provided between ground and the power supply output edge 102. According to the present invention, the source and drain of the low voltage side switch 106 are connected to ground and the output voltage coil 120, respectively. If the source voltage, Vout is higher than the standard voltage, the low voltage side switch 106 is turned on by the power supply control device 130 to reduce the output voltage.

An output capacitor 115 is provided between the power supply output edge 102 and ground. One terminal of the output voltage coil 120 is connected to a node common to the source of the high voltage side switch 103 and the drain of the low voltage side switch 106. The other terminal of the output voltage coil 120 is connected to the output capacitor 115 and the power supply output edge 102. The output voltage coil 120 supplies electric power to the output capacitor 115 and the power supply output edge 102.

The power supply control device 130 is a semiconductor device that controls the source voltage supply unit 100 when supplying a source voltage. In addition, the power supply control device 130 also controls discharge of the output capacitor 115 during a power supply interrupt. The power supply control device 130 has a discharge path 132, a source voltage controller 150, a timing controller 155 and an inverter logic element 160.

The discharge path 132 is connected between the source of the high voltage side switch 103 and the drain of the low voltage side switch 106 through a switching node terminal 170 of the power supply control device 130. The discharge path sinks electric charge accumulated in the output capacitor 115 to ground through the output voltage coil 120 and the switching node terminal 170 during a power supply interrupt. The discharge path 132 includes a discharge resistor 135, a discharge switch 140 and a rectifier 145.

The discharge switch 140 is turned on to enable the discharge path 132 in the event of an interrupt to the source voltage supply. Conversely, if source voltage is being supplied, the discharge switch 140 is turned off to disable the discharge path 132. In this embodiment, the source and drain of the discharge switch 140 is connected to ground and one edge of the discharge resistor 135, respectively. A discharge rectifier 145 is provided to prevent current from flowing from the discharge path 132 to the power supply output edge 102. For example, when initializing the source voltage supply, the discharge rectifier 145 prevents switching current from flowing to the output voltage coil 120 and the power supply output edge 102 through the discharge path 132.

The source voltage controller 150 drives the gate of the high voltage side switch 103 included in the source voltage supply unit 100 and the gate of the low voltage side switch 106 through a high voltage side switch driving terminal 172 and a low voltage side switch driving terminal 174, respectively. These are the control inputs to the source voltage supply unit 100.

In addition, as in the case of the discharge path 132, the source voltage controller 150 is connected between the source of the high voltage side switch 103 and the drain of the low voltage side switch 106 through the switching node terminal 170. When supplying source voltage, the source voltage controller 150 monitors source voltage input through the switching node terminal 170.

If source voltage is lower than the voltage required by the particular standard adopted, the source voltage controller 150 turns on the high voltage side switch 103 through the high voltage side switch driving terminal 172, and turns off the low voltage side switch 106 through the low voltage side switch driving terminal 174. Conversely, if the source voltage is higher than the standard voltage, the source voltage controller 150 turns on the low voltage side switch 106 through the low voltage side switch driving terminal 174, and turns off the high voltage side switch 103 through the high voltage side switch driving terminal 172. Accordingly, the source voltage controller 150 regulates the source voltage, Vout supplied to the power supply output edge 102 to equal the value of the standard voltage.

In addition, if supply of source voltage is interrupted, the source voltage controller 150 turns off the high voltage side switch 103 and the low voltage side switch 106 through the high voltage side switch driving terminal 172 and the low voltage side switch driving terminal 174, respectively. In this regard, the source voltage controller 150 enables the discharge path 132 to discharge the output capacitor 115 in the event of an interruption of the source voltage supply.

Alternatively, if the power supply apparatus 10 or a device connected to the power supply apparatus 10 malfunctions or experiences an intermittent failure and supply of source voltage is halted, the source voltage controller 150 turns off the high voltage side switch 103 and turns on the low voltage side switch 106. This allows source voltage to decrease to 0 V more quickly compared to the case when the output capacitor 115 is dissipated through the discharge path 132.

The timing controller 155 controls operation timing of the source voltage controller 150 and the discharge path 132. An external signal controls the start and stop of the source voltage supply. More specifically, the timing controller 155 outputs a power signal that is asserted high when starting the supply of source voltage and asserted low if halting supply, to the source voltage controller 150. When receiving the signal, the source voltage controller 150 starts or stops the supply of source voltage from the source voltage supply 100.

In addition, the timing controller 155 outputs a discharge path disable signal that is asserted low if discharging the output capacitor 115 and asserted high if not discharging the output capacitor 115 through the discharge path 132. The inverter logic element 160 inverts the logic value of the discharge path disable signal and inputs the results to the gate of the discharge switch 140. If the timing controller 155 asserts a discharge path disable signal, a logic "1" drives the gate of the discharge switch 140 to enable the discharge path 132. However, if the timing controller 155 asserts a high discharge path disable signal, the logic value "0" is input to the gate of the discharge switch 140 to turn off the discharge switch 140 and disconnect the discharge path 132.

The above-described power supply apparatus 10 turns off the high voltage side switch 103 and the low voltage side switch 106, and turns on the discharge switch 140 when the supply is interrupted, thereby enabling the output capacitor 115 to discharge through the discharge path 132. The amount of voltage undershoot is controlled by the output capacitance and discharge resistance. Moreover, the time it takes the source voltage Vout to decrease to 0 volts upon the occurence of a power supply interrupt is similarly dependent on the RC time constant associated with the output capacitor 115 and discharge resistor 135. Ideally, this time constant is greater than or equal to the time it takes the source voltage, Vout to decrease to 0 volts. This enables the above-described power supply apparatus 10 to reduce voltage undershoot while rapidly discharging the output capacitor 115.

Figure 2:
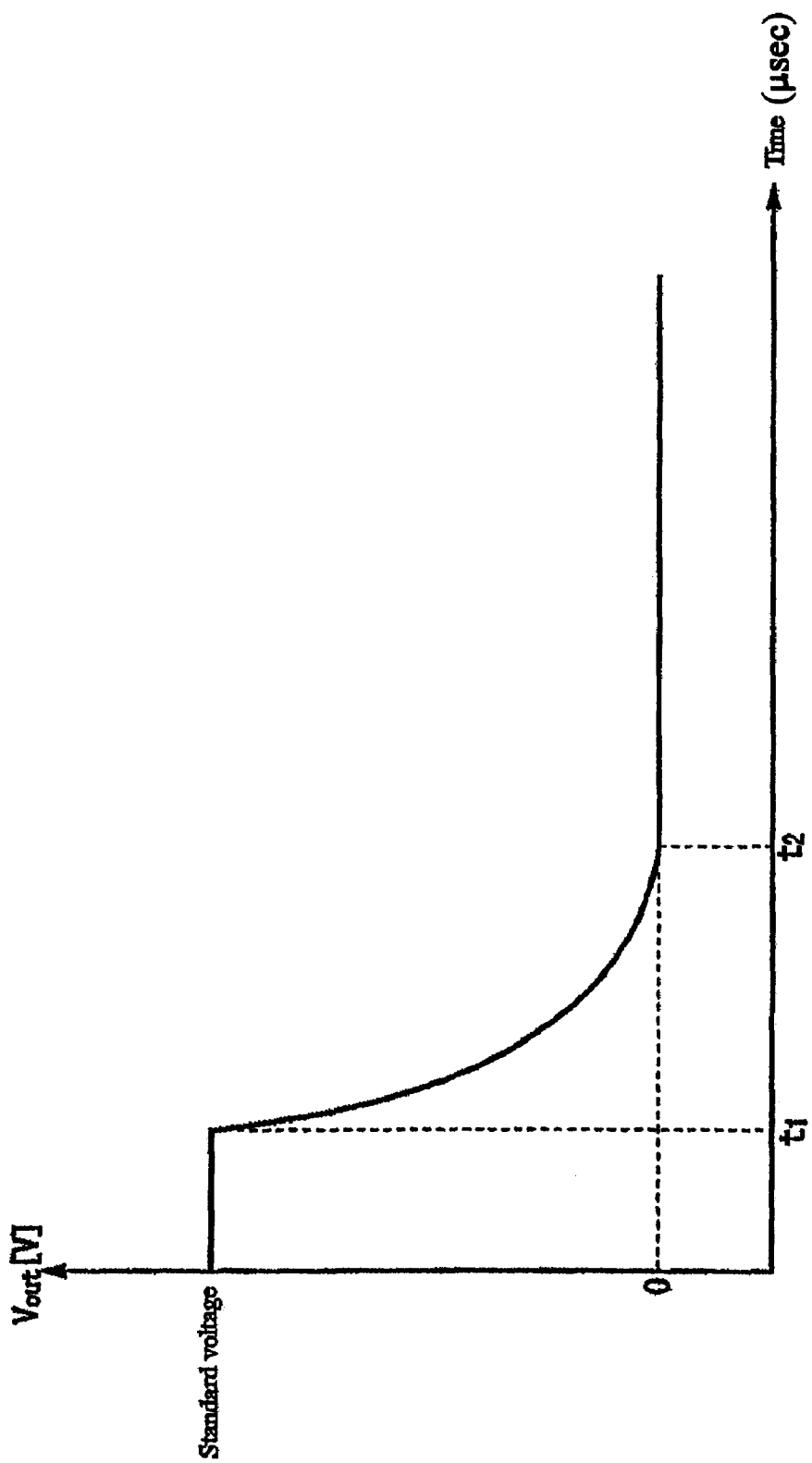
FIG. 2 shows the source voltage waveform when halting power supply from the power supply apparatus 10 according to an embodiment of the invention.

FIG. 2 shows an example of a source voltage waveform when the output voltage of the power supply apparatus 10 is interrupted. When a source voltage is supplied, the source voltage controller 150 controls the high voltage side switch 103 and the low voltage side switch 106 to allow a source voltage, which is supplied to the power supply output edge 102, to balance with a standard voltage. When a control signal to halt the supply of source voltage is received at time, t1, the timing controller 155 transmits a logic "0" power supply signal, which indicates the interrupt of the supply of source voltage to the source voltage controller 150, and transmits a logic "0" discharge path disable signal, which enables the discharge path 132. When receiving the logic low discharge path disable signal, the source voltage controller 150 turns off the high voltage side switch 103 and the low voltage side switch 106, and the timing controller 155 turns on discharge switch 140 through the inverter element 160. This sequence enables electric charge accumulated in the output capacitor 115 to discharge through the output voltage coil 120, the switching node terminal 170, the discharge diode 145, the discharge resistor 135 and the discharge switch 140, so that source voltage at the power supply output edge 102 becomes 0 V at time t2.

The value of the discharge resistor 135 is determined according to the value of the output capacitor 115 so that the degree of undershoot is within a specified value. The duration of the undershoot component of the interrupted power supply signal is preferably within the time (t2-t1) until the source voltage goes to 0 volts. Ideally, the time (t2-t1) period during which the source voltage decreases to 0 volts is a few milliseconds. Therefore, if the value of the output capacitor 115 is a few hundred pF, a discharge resistor 135 value of about 1 ohm will produce a time constant in the range of 10 milliseconds or less.

Figure 3:
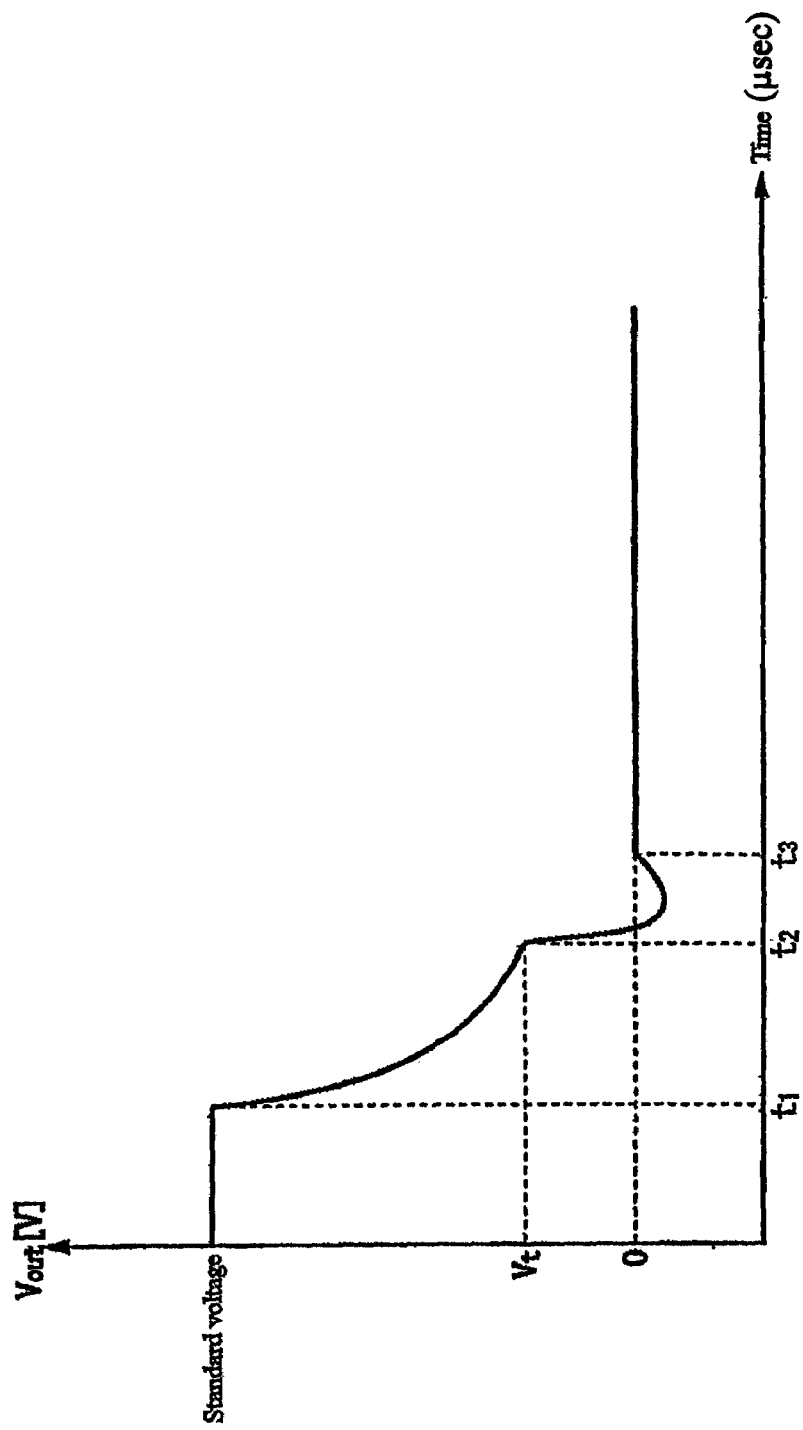
FIG. 3 depicts a source voltage waveform when halting power supply from the power supply apparatus 10 according to another embodiment of the invention.

According to a second embodiment of the invention, FIG. 3 shows a source voltage waveform steadily decreasing toward a threshold voltage at which point the power supply control apparatus sets the voltage supply to 0 volts. At time, t1, the timing controller 155 transmits a power supply signal "0" to the source voltage controller 150 indicating the source voltage is no longer being supplied. Next, the discharge path 132 is enabled. In response to the loss of power supply, the source voltage controller 150 turns off the high voltage side switch 103 and the low voltage side switch 106, and the timing controller 155 turns on the discharge switch 140 through the inverter element 160. Finally, the electric charge accumulated in the output capacitor 115 is discharged to ground through the output voltage coil 120, the switching node terminal 170, the discharge diode 145, the discharge resistor 135 and discharge switch 140.

At time, t2, the source voltage controller 150 turns on the low voltage side switch 106 after a predetermined time period following activation of the discharge path 132. At this point, the power supply output voltage is preferably within the range of a standard voltage and ground potential. When the power supply output decreases to Vt, the source voltage controller 150 turns on the low voltage side switch 106 after the timing controller 155 enables the discharge path 132. Subsequent to t2, the source voltage controller 150 will regulate the discharge switch 140 as required to maintain Vout at 0 volts.

As the waveform in FIG. 3 approaches time, t3, the low voltage switch 106 provides a direct path between the output voltage node, Vout and ground, thereby driving the source voltage to 0 volts.

According to the second embodiment, when a power supply interrupt occurs, the discharge path 132 is conductive for a predetermined time and the source voltage is reduced to 0 V and the low voltage side switch 106 is turned on to allow source voltage to go to 0 volts without significant undershoot. Even if the low voltage side switch 106 is turned on to rapidly discharge the output capacitor 115, the source voltage, Vt at time, t2 is adjusted so that the value of undershoot of the source voltage is within a specified range. The power supply apparatus 10 maintains the value of undershoot within the specified range, and can tolerate a sudden loss of power supply voltage at a high speed.

Alternatively, in the above-described method corresponding to a second embodiment of the invention, after a pre-determined time elapses following a loss of supply of source voltage and the discharge path 132 through the discharge switch 140 is conducting, the source voltage controller 150 may also turn on the low voltage side switch 106. In addition, as the source voltage approaches Vt, the source voltage controller 150 can measure source voltage through the switching node terminal 170, and then turn on the low voltage side switch 106.

Figure 4:
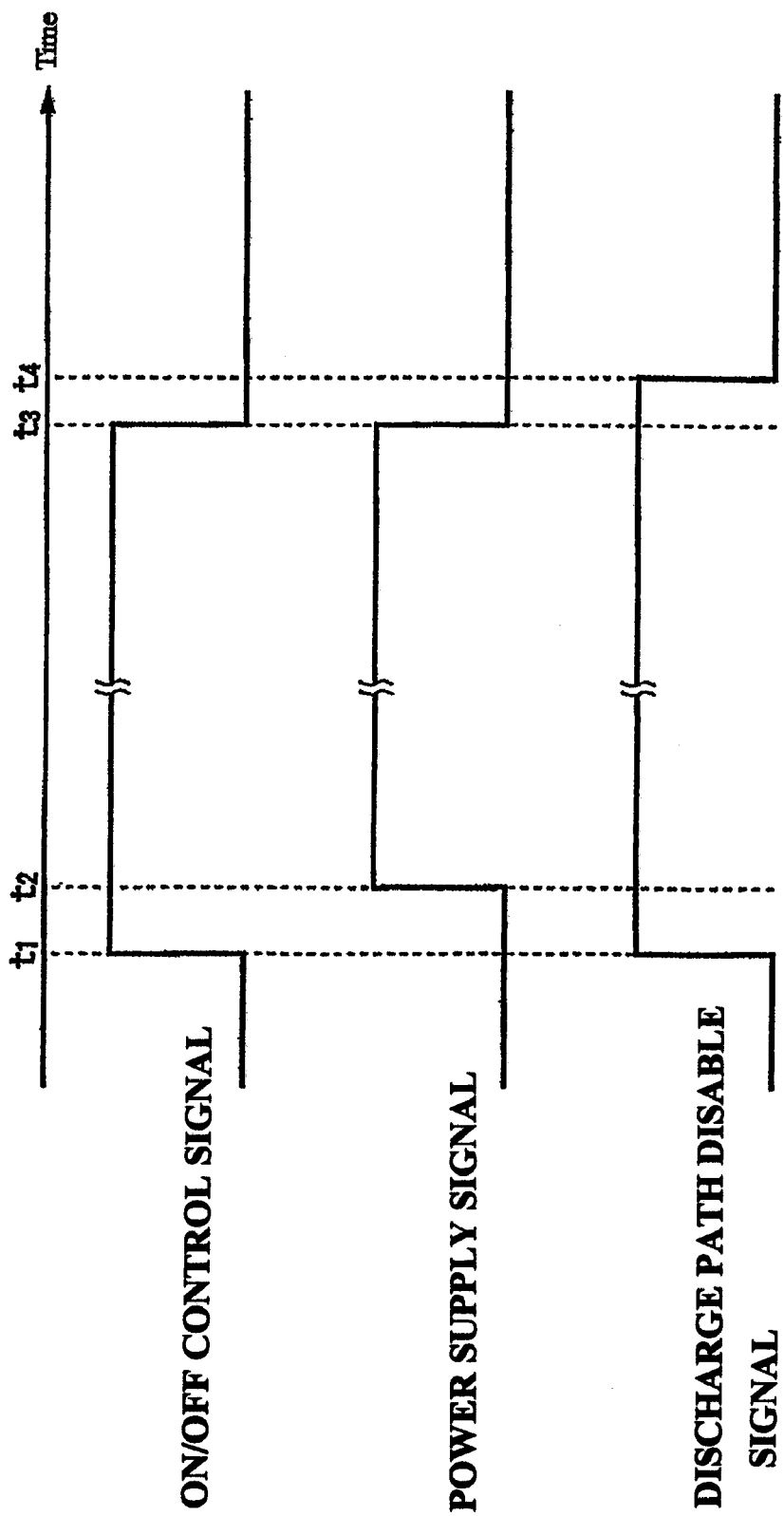
FIG. 4 illustrates a control timing diagram from the start of supplying power to the termination of supplying power by the power supply apparatus 10 according to an embodiment of this invention.

FIG. 4 shows control timing from initialization of a power supply until the supply of power is terminated. At time, t1, the timing controller 155 receives a control signal, indicating an initial supply of a source voltage, from outside of the power supply control device 130. Once the On/Off control signal is asserted high, the timing controller 155 sets the discharge path disable signal to a logic "1" at t1 by opening the discharge switch 140. The timing controller 155 then asserts the power supply signal high at time, t2 and outputs the power supply signal to the source voltage controller 150 allowing the source voltage supply unit 100 to begin supplying a source voltage.

At time, t3, the timing controller 155 receives a control signal indicating the interruption of supply of source voltage, from outside of the power supply control device 130. If the supply of source voltage is terminated after receiving the control signal, the timing controller 155 asserts the power supply signal to logic zero and outputs the power supply signal to the source voltage controller 150 at t3 to allow the source voltage supply unit 100 to terminate the supply of source voltage. The timing controller 155 then sets the discharge path disable signal to a logic "0" at time, t4, and closes the discharge switch 140 to discharge the output capacitor 115.

In the above-described power supply apparatus 10, the timing controller 155 manages operation timing of the source voltage controller 150 and the discharge path 132 so that the high voltage side switch 103 and the discharge switch 140 are not turned on at the same time. In the event the high voltage side switch 103 and the discharge switch 140 are turned on at the same time, the timing controller 155 can prevent an over-current condition by sinking the current flowing from the high voltage source, Vin to ground through the discharge path 132. Accordingly, the timing controller 155 can mitigate the risk of damage to internal circuits from sourcing a voltage in excess of the standard voltage utilized in the system.

While the invention has been described in detail, the foregoing description is in all aspects illustrative and not restrictive. It is understood that numerous other modifications and variations can be devised without departing from the scope of the invention.

For example, the source voltage supply unit 100 in the embodiments may also be one of various power supply circuits, in which a voltage source is connected to the power supply output edge 102 through the output voltage coil 120 if source voltage is supplied and the voltage source is disconnected from the power supply output edge 102 if supply of source voltage is interrupted.

In addition, the switching node terminal 170 may also be LX (switching node) terminal of power source IC. Alternatively, the source voltage controller 150 and the discharge path 132 may also be connected to the power supply output terminal 102 through a different terminal of the power supply control device 130. Furthermore, the timing controller 155 and/or the discharge path 132 may also be provided external to the power supply control device 130.

The invention claimed is:

1. An integrated circuit power supply for providing a direct current (DC) source voltage, comprising:
   a source voltage supply unit to supply said DC source voltage;
   a power supply control device coupled to the source voltage supply unit comprising a
      a source voltage controller to control said high voltage side switch and said low voltage side switch when an interrupt of a supply of said DC source voltage occurs,
      a discharge path circuit coupled to the source voltage controller and a switching node terminal of the power supply control device and
      a timing controller coupled to the source voltage controller and the discharge path circuit,
         wherein the timing controller is coupled to the discharge path circuit through an inverter driving a discharge path disable signal from the timing controller to the discharge path circuit;
   an output capacitor coupled to an output node of the integrated circuit power supply and a ground terminal; and
   an output voltage coil coupled to the power supply control device and to the source voltage supply unit at a first terminal and to the output capacitor and the integrated circuit power supply output node at a second terminal.

2. The integrated circuit power supply according to claim 1, wherein the source voltage supply unit further comprises:
   a high voltage side switch to connect a voltage source higher than the DC source voltage to the power supply output when the DC source voltage supplied by the source voltage supply unit is lower than a predetermined voltage; and
   a low voltage side switch to connect a voltage source lower than said DC source voltage to the power supply output when the DC source voltage supplied by the source voltage supply unit is higher than the predetermined voltage.

3. The integrated circuit power supply according to claim 1, wherein the discharge path circuit further comprises:
   a rectifier coupled to the source voltage controller to prevent current from flowing from the discharge path to the power supply output;
   a resistor through which a discharge current is directed from the output capacitor to a ground terminal when an interrupt to the supply of DC source voltage occurs; and
   a switch coupled to the resistor that is closed when the supply of DC source voltage is interrupted.

4. The integrated circuit power supply according to claim 1 wherein the discharge path circuit further comprises:
   a switch coupled to the resistor that is open when the supply of DC source voltage is continuous.

5. The integrated circuit power supply according to claim 1, wherein the source voltage controller turns off the high voltage side switch and turns on the low voltage side switch when the supply of DC source voltage is interrupted.

6. The integrated circuit power supply according to claim 1, wherein the source voltage controller turns off the high voltage side switch and turns off the low voltage side switch when the supply of DC source voltage is interrupted.

7. The integrated circuit power supply according to claim 1, wherein the source voltage controller, in response to an interrupt of the supply of DC source voltage, turns on the low voltage side switch within a predefined delay period after enabling the discharge path.

8. The integrated circuit power supply according to claim 1, wherein the source voltage controller, after enabling the discharge path, turns on the low voltage side switch within a predetermined time period when the source voltage is less than a predetermined voltage and greater than a ground potential.

9. A method of suppressing voltage fluctuation in an integrated circuit power supply, the method comprising:
   providing a source voltage supply unit to supply a DC source voltage to an output of the integrated circuit power supply;
   coupling a power supply control device to the source voltage supply unit;
   coupling an output voltage coil to the power supply control device and the source voltage supply unit;
   coupling an output capacitor to the output and a ground terminal; and
   when an interrupt to the supply of the DC source voltage occurs, enabling a discharge path coupled to the output.

10. The method according to claim 9, wherein the power supply control device comprises:
    a source voltage controller to regulate the supply of the DC source voltage in a continuous operating mode.

11. The method according to claim 9, wherein the power supply control device further comprises:
    a timing controller that directs the operational timing of the source voltage controller and the discharge path.

12. The method according to claim 11, wherein the timing controller directs a supply of a DC source voltage to resume in a normal operating mode following an interrupt of the DC supply voltage.

13. The method according to claim 11, wherein the timing controller enables the discharge path with a discharge switch following the interruption of the DC source voltage.

14. The method according to claim 9, wherein the discharge path comprises a rectifier, a resistor and a switch, wherein
    the rectifier is coupled to the source voltage controller to prevent current from flowing from the discharge path to the output of the integrated circuit power supply;
    the resistor is coupled to the rectifier and the switch, wherein a discharge current is sinked through the resistor from the output capacitor to the ground terminal when an interrupt to the supply of DC source voltage occurs; and
    a switch coupled to the resistor and the ground terminal.

15. The method according to claim 9, wherein the discharge path closes when the supply of the DC source voltage is interrupted.

16. The method according to claim 15, wherein the source voltage controller turns off the high voltage side switch and turns off the low voltage side switch when the supply of DC source voltage is interrupted.

17. The method according to claim 15, wherein the source voltage controller turns off the high voltage side switch and turns on the low voltage side switch when the supply of DC source voltage is interrupted.

18. The method according to claim 9, wherein the discharge path opens when the supply of DC source voltage is continuous.

19. The method according to claim 9, wherein the source voltage supply unit comprises:
   a high voltage side switch to connect a voltage source higher than the DC source voltage to the power supply output when the DC source voltage supplied by the source voltage supply unit is lower than a predetermined voltage; and
   a low voltage side switch to connect a voltage source lower than the DC source voltage to the power supply output when the DC source voltage supplied by the source voltage supply unit is higher than the predetermined voltage.

* * * * *